United States Patent
Weaver

(10) Patent No.: US 9,290,687 B1
(45) Date of Patent: Mar. 22, 2016

(54) WOOD-BASED LOSS CIRCULATION MATERIAL AND METHOD FOR MANUFACTURING SAME

(75) Inventor: William R. Weaver, Pine Bluff, AR (US)

(73) Assignee: Fiber Resources, Inc., Pine Bluff, AR (US)

( * ) Notice: Subject to any disclaimer, the term of this patent is extended or adjusted under 35 U.S.C. 154(b) by 572 days.

(21) Appl. No.: 13/494,743

(22) Filed: Jun. 12, 2012

(51) Int. Cl.
C09K 8/035 (2006.01)
C09K 8/02 (2006.01)

(52) U.S. Cl.
CPC .................................. *C09K 8/035* (2013.01)

(58) Field of Classification Search
CPC ........ C09K 8/02; C09K 8/03; C09K 2208/04; C09K 2208/08
USPC .................................. 507/104, 204
See application file for complete search history.

(56) References Cited

U.S. PATENT DOCUMENTS

| | | | |
|---|---|---|---|
| 2,749,308 A * | 6/1956 | Van Beckum | E21B 21/003 507/104 |
| 4,015,951 A * | 4/1977 | Gunnerman | 44/595 |
| 4,211,740 A * | 7/1980 | Dean et al. | 264/68 |
| 4,428,844 A | 1/1984 | Wagener | |
| 4,836,940 A | 6/1989 | Alexander | |
| 4,957,174 A | 9/1990 | Whitfill et al. | |
| 5,763,367 A | 6/1998 | Burts, Sr. | |
| 6,323,158 B1 | 11/2001 | Burts, Sr. | |
| 6,399,545 B1 | 6/2002 | Rose | |
| 6,630,429 B1 | 10/2003 | Cremeans et al. | |
| 6,797,675 B2 | 9/2004 | Von Krosigk | |
| 6,809,067 B2 | 10/2004 | Von Krosigk | |
| 6,825,152 B2 | 11/2004 | Green | |
| 6,835,697 B2 | 12/2004 | Von Krosigk | |
| 8,043,997 B2 | 10/2011 | Whitfill et al. | |
| 2009/0064569 A1 * | 3/2009 | Khater | 44/589 |

* cited by examiner

*Primary Examiner* — Aiqun Li

(57) ABSTRACT

A wood-based loss circulation material is formed with a density matched to the density of the drilling fluid to which the loss circulation material will be added. The material is formed from sawdust or fiber pressed under high pressure into high-density pellets. The resulting pellets are brittle, and may be crumbled and screened into particles of an appropriate size for a particular drilling fluid application. Different particle sizes may be employed to prevent seepage or fill voids during the well drilling process. The particles do not disassociate into their constituent materials when in the drilling fluid, and thus maintain their density during use.

14 Claims, 1 Drawing Sheet

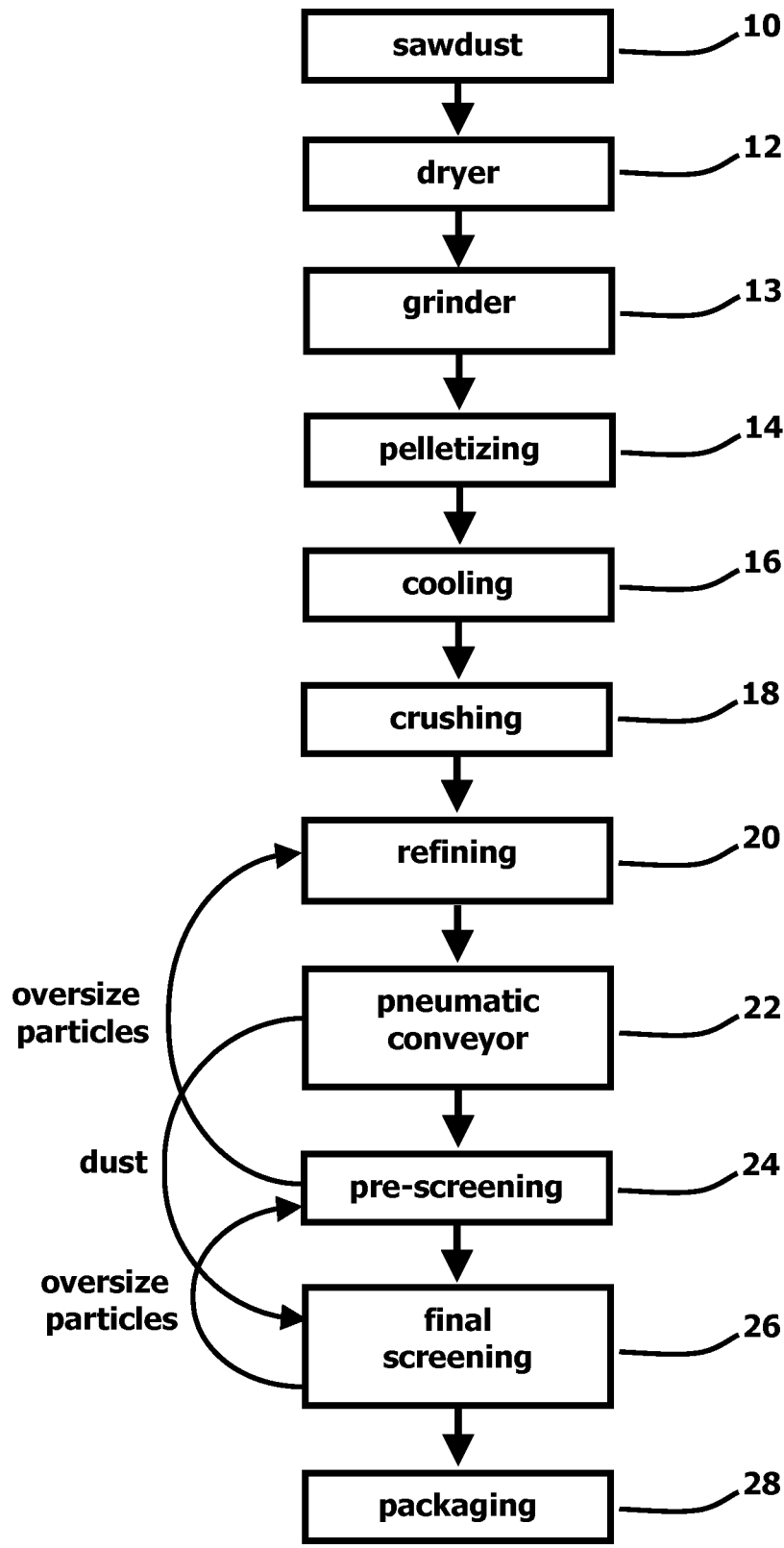

WOOD-BASED LOSS CIRCULATION MATERIAL AND METHOD FOR MANUFACTURING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to drilling fluid additives used in oil and gas drilling, and more particularly to wood-based additives that do not employ separate binding agents.

Subterranean wells are commonly dug for the purpose of reaching desirable oil and gas deposits beneath the earth. It is the usual practice when drilling wells into the earth by means of rotary drill machinery to introduce a drilling fluid into the well as the well is being formed. These fluids (often referred to as "mud") are used to sweep away cuttings from the cutter head as a well is drilled. The fluids also serve the purpose of cooling the cutter head during the drilling head operation, since the cutter head is subject to intense heat as a result of friction and subterranean pressures during the cutting process. After being introduced downhole, the fluids are brought to the surface where they may be screened to remove cuttings and other particulate matter, then reused. Many different formulations for drilling fluids have been employed in different environments, with both oil-based and water-based fluids being in widespread use today for various land-based and offshore drilling applications.

One of the problems with the use of drilling fluids is that the fluids may be lost during well boring. One reason for the loss of drilling fluids is that the fluid may seep into subterranean rock formations that have a high permeability to the material used for the drilling fluid. This is often exhibited as a slow but steady loss of drilling fluids being returned to the surface. Another reason for the loss of drilling fluids is that voids may be encountered in the subterranean rock formations, and drilling fluid may flow out of the well and into these voids. This problem may be exhibited as a sudden, dramatic drop in the return of drilling fluids to the surface. To avoid drilling fluid losses due to either or both of these phenomena, it is common to employ additives in the drilling fluid for the purpose of lost circulation control. The art includes numerous additives, often referred to as loss circulation materials or LCMs, that have been successfully employed in both water-based and oil-based drilling fluids. In a typical drilling operation, the loss circulation material is added to the drilling fluid in a "mud pit" adjacent to the drilling area. The drilling fluid is drawn from this pit in order to be used in connection with drilling, and is then returned to the pit after being drawn from the wellbore and screened to remove cuttings and other impurities. The use of a mud pit is also advantageous in that it allows the drilling fluid to cool before being returned to the wellbore for repeated use.

A number of attempts have been made to use wood-based materials as a loss control material in drilling fluids. For example, U.S. Pat. No. 5,763,367 teaches the use of a drilling fluid additive that may include ground wood fiber. U.S. Pat. No. 6,630,429 teaches a lost circulation material that uses natural fiber material. U.S. Pat. No. 6,399,545 teaches a drilling fluid additive that may include yellow pine or yellow pine bark. Wood-based loss control materials are environmentally safe, and thus offer a distinct advantage in that regard over certain inorganic chemical formulations. Also, some wood-based loss circulation materials do not change the pH of the drilling fluid, which may also be important in certain drilling applications. Finally, wood-based materials are available at very low cost, providing another advantage to their use.

A significant problem with wood-based materials is the high density of the drilling fluid as compared to the lower density of commonly used wood-based materials. Because most wood-based additives are of a significantly lower density than the drilling fluid, they tend to float on top of the drilling fluid when added. The necessity of thoroughly mixing the wood-based materials into the drilling fluid slows down the well drilling operation, and has largely prevented widespread adoption of wood-based products as loss control materials. In addition, the light but bulky LCM material takes up significant amounts of storage space due to the low product density. While this is not typically a concern in land-based drilling operations, storage space is a very significant concern for offshore drilling, due to the limited space available on oil drilling platforms and the high cost of transporting bulky materials to the platforms by sea.

The prior art does include attempts to produce a wood-based loss circulation material that has a higher density than loose wood-based material. For example, U.S. Pat. No. 4,428,844 teaches a loss circulation material that is formed of ground paper pressed into pellets. The density of the pellets depends upon the pressure used during the pellet formation process. The examples stated in the patent include paper pellets with densities of about 31.5 pounds per cubic foot, 34 pounds per cubic foot, and 40.1 pounds per cubic foot. U.S. Pat. No. 6,825,152 teaches that the use of a pelletized, higher-density material speeds the incorporation of the material into drilling fluid. In this case, ground wood is taught as an example material. A cellulosic additive is taught with an uncompressed density of 10 pounds per cubic foot, with the pelletizing process resulting in a material with a density of about 17 pounds per cubic foot. This patent recognizes the need to provide additives in a form that mixes with the drilling fluid at a higher speed; nevertheless, the product is introduced into the drilling fluid in a pellet form, and must disperse into the constituent particles forming the pellets upon introduction to the drilling fluid in order to provide its loss control properties.

Despite these previous attempts to produce a workable, wood-based loss circulation material, wood-based loss circulation materials have failed to see widespread adoption. Investigations by the inventor hereof have led to the conclusion that there are two primary reasons for the failure of prior art wood-based LCM materials. First, the prior art has generally failed to recognize the importance of matching the density of the wood-based loss circulation material to the density of the drilling fluid, and thus the prior art does not include a wood-based loss circulation material that exhibits this property. Typical drilling fluids have a density of from about 67 to about 90 pounds per cubic foot. If the density of the loss circulation material is significantly lower than the density of the drilling fluid, then it will tend to simply float on top of the drilling fluid; likewise, if the density of the loss circulation material is significantly higher than the density of the drilling fluid, then the loss circulation material will simply fall to the bottom of the mud pit, and will not properly mix with the drilling fluid. The prior art does not include a wood-based loss circulation material with a density matched to the drilling fluid.

A second problem is that prior art wood-based LCMs have tended to change the electrical properties of the drilling fluid, whereas electrical stability is an important parameter in drilling fluid performance. The electrical stability of an oil-based drilling fluid relates to its emulsion stability and oil wetting capability, and is generally tested by measuring the current between two charged plates across a varying voltage. The test results generally relate to a drilling fluid's oil-wetting of solids and to stability of emulsion droplets, although the interrelationship of these factors is not well understood. The introduction of any suspended solids tends to change the electrical properties exhibited by the drilling fluid. The inventor has thus recognized that a wood-based LCM material that does not change the electrical properties of the drilling fluid would be highly desirable.

The present invention overcomes the limitations of the prior art, solves the problems identified by the inventor with respect to the prior art, and presents certain advantages over the prior art as set forth below.

References mentioned in this background section are not admitted to be prior art with respect to the present invention.

BRIEF SUMMARY OF THE INVENTION

The present invention is directed to a wood-based loss circulation material and a method of forming such a material. This material is highly compressed such that its density approximately matches that of the drilling fluid into which it will be mixed. The result is a loss circulation material that easily mixes with the drilling fluid, thereby allowing for fast addition of the loss circulation material that does not unduly delay the drilling process. The material is formed by employing very high pressures during the pelletizing process, wherein refined sawdust is reduced to high-density pellets. The resulting pellets are very brittle, and thus may be easily crumbed and screened into appropriate size groups for various loss circulation material applications. Hardwood is the preferred wood fiber source because it does not change the viscosity of the drilling fluid by absorbing excessive amounts of either water or petroleum, depending upon the base of the fluid, but the invention is not so limited and may include other fiber sources. The crumbles introduced into the drilling fluid do not appreciably break down into their constituent components while in the drilling fluid, and thus no delay is required in order for the material to become active in the drilling fluid. The material also has been found to not significantly alter the electrical stability of the drilling fluid.

In one aspect of the present invention, the invention is directed to a loss circulation material for introduction into a drilling fluid, the material consisting essentially of wood fiber and water, wherein the material has a density about equal to the density of the drilling fluid.

In another aspect of the present invention, the invention is directed to a method for manufacturing a loss circulation material for introduction into a drilling fluid, wherein the material consists essentially of wood fiber and water, the method comprising the steps of drying a sawdust material to a desired moisture content, pelletizing the sawdust material to produce pellets, wherein the density of the pellets is about equal to the density of the drilling fluid, crumbling the pellets into smaller particles, and screening the particles for size.

It is therefore an object of the present invention to provide for a wood-based loss circulation material with a density approximately equal to the density of the drilling fluid to which it is added.

It is also an object of the present invention to provide for a crumbled loss circulation material that easily mixes with a desired drilling fluid without significantly disassociating into its constituent particles.

It is a further object of the present invention to provide for a loss circulation material that is inexpensive to produce and transport.

It is a further object of the present invention to provide for a loss circulation material that is compact when stored.

It is a further object of the present invention to provide for a loss circulation material that is environmentally safe.

It is a further object of the present invention to provide for a loss circulation material that does not change the pH of a drilling fluid when added to the drilling fluid.

It is a further object of the present invention to provide for a loss circulation material that does not change the electrical properties of a drilling fluid when added to the drilling fluid.

It is a further object of the present invention to provide for a loss circulation material that does not change the density of a drilling fluid when added to the drilling fluid.

These and other features, objects and advantages of the present invention will become better understood from a consideration of the following detailed description of the preferred embodiments and appended claims in conjunction with the drawing as described following:

BRIEF DESCRIPTION OF THE SEVERAL VIEWS OF THE DRAWINGS

FIG. 1 is a flow chart illustrating the process for forming a wood-based loss circulation material according to a preferred embodiment of the present invention.

DETAILED DESCRIPTION OF THE PREFERRED EMBODIMENT(S)

With reference to FIG. 1, a method of manufacturing a loss circulation material according to a preferred embodiment of the present invention may be described.

The base material used in the manufacturing of the loss circulation material according to a preferred embodiment of the present invention is hardwood sawdust or fiber. The material is acquired at step 10 of FIG. 1. This material is widely available at relatively low cost from lumber mills and like locations. Hardwood is preferred because it does not change the viscosity of the drilling fluid by absorbing excessive amounts of fluid. Oak is the preferred hardwood material due to its acidity. While 100% hardwood sawdust or fiber is used in the preferred embodiment of the present invention, however, softwood sawdust or fiber, a blend of hardwood and softwood sawdust or fiber, or other wood-based materials may be used in alternative embodiments of the present invention. Examples include cedar fiber, and torrefied wood (which yields a hydrophobic product).

The hardwood sawdust or fiber is dried at step 12 of FIG. 1. Equipment for drying sawdust, fiber, and other wood-based materials is well known in the art. In the preferred embodiment, the sawdust or fiber is dried to the point where it is comprised of 10% to 14% moisture by weight, while it is believed to be ideal to dry the sawdust to about 11% moisture by weight. In alternative embodiments, more or less moisture may be retained in the dried sawdust. Retaining less moisture in the pellet will result in a denser pellet, so drying step 12 is an important factor in the density of the final product.

The dried sawdust or fiber is ground to a uniform particle size at step 13. The preferred particle size is less than 5 mesh, but larger or smaller particles may be employed in alternative embodiments of the present invention, or this step of creating a uniform particle size may be skipped altogether. A hammer mill is used in the preferred embodiment to reduce the wood particles to a uniform size, although other means may be used in alternative embodiments. The reduction of the wood particles to a uniform size is an aid to pelletization, as described below.

At step 14, the dried material is pelletized. Pellet mills and other machinery that may be used to form pellets from sawdust, wood fiber, and like materials are well known in the art. By controlling the amount of pressure applied during the pelletization process, the density of the resulting pelletized material may be controlled. In the preferred embodiment, the density of the resulting pelletized material is very high, in the range of about 75 pounds per cubic foot to about 85 pounds per cubic foot. (It may be noted that this is the actual pellet density, not the bulk density of the product when packaged, which will be lower.) A very high pressure of about 50,000 pounds per square inch is used in a pellet mill according to the preferred embodiment of the present invention in order to achieve this density. This density is intended to loosely match that of common drilling fluids. In alternative embodiments, different pressures may be used in the pelletization process in order to produce pellets of different density in order to match drilling fluids of different densities. The pressures used in this process are so high that the individual fiber cells in the pellets are crushed, such that the pellets are quite brittle and easily reduced in size (crumbled) without lowering the actual particle density.

The pellets according to a preferred embodiment are approximately ¼" in diameter. Other sizes, however, are within the scope of the invention. By lowering the diameter of the pellet, the surface area of the pellet (and, therefore, of the final crumbled material) will be increased. Surface area and geometry are believed by the inventor to play an important role in the functional parameters of the finished material.

The pelletization process results in a great deal of heat within the material being pelletized, particularly at the very high pressures employed with respect to the preferred embodiment of the present invention. This heat aids in the process of forming an integral pellet without the need to use additional binding agents. No binding agent other than the moisture already present in the material is necessary. In addition, the heat and pressure cause the surface of the pellets to be thermomechanically changed through fluidization of the lignins in the wood. This heat and pressure also serves to sanitize the resulting wood pellets.

In the preferred embodiment, pellets resulting from the pelletization process of step 14 will have a temperature of about 300° Fahrenheit. The pellets must be cooled for further processing, and this cooling takes place at step 16 of FIG. 1. In the preferred embodiment, the pellets are cooled to ambient temperature at step 16. Cooling results in the loss of additional moisture within the pellets, so that in the preferred embodiment the pellets have a moisture content of only about 8% by weight after the cooling process of step 16. The cooled pellets may be stored for later use, or immediately conveyed for further processing. Optionally, the cooled pellets may be screened to remove any non-pellet material, such material then being returned to the feed stock of the pellet mill at step 14.

At step 18 of FIG. 1 the cooled pellets are crushed or crumbled into smaller particles. In the preferred embodiment of the present invention this step may be performed using a roller mill or pellet crumbler, both of which are well known in the art. Examples include single or double pairs of rollers in stacked crumble roller mills. The crushing or crumbling of the pellets may be performed in any number of other ways in alternative embodiments of the present invention.

The crumbled pellets are then metered into a disk refiner or attrition mill at refining step 20. Disk refiners and attrition mills are well known in the art. In the preferred embodiment, an Andritz Sprout-Bauer attrition mill model DM-24 is used to perform this step, driven by a 50 horsepower motor and using a set of "G" patterned refining plates. Other equipment may be substituted in alternative embodiments of the present invention. The purpose of this step is to cut the particles in order to provide further reduction in particle size, without fluffing or fraying of the individual wood fibers in the particles. Fluffing or fraying would serve to lower the overall density of the resulting particles and should therefore be avoided.

At step 22, the refined particles are delivered to a pneumatic conveyor system. Pneumatic conveyors use pipes or ducts that carry a mixture of materials with a stream of air. Small, relatively dry particles such as those that are delivered from the refiner at step 20 according to the preferred embodiment of the present invention may be easily moved by means of pneumatic conveying systems. Numerous pneumatic conveying systems, including both vacuum systems and positive pressure systems, are known in the art. In the preferred embodiment of the present invention, the pneumatic conveyor serves not only to move the particles to the next step in manufacturing, but also provides additional cooling of the particles, which is desirable for further processing. In the preferred embodiment, the particles are cooled from a temperature of about 200 to 300° Fahrenheit leaving the refiner to about ambient temperature at the end of the pneumatic conveyor. This results in further moisture loss in the material, such that the resulting material has a moisture by weight content of less than 8%, preferably in the range of 4% to 8% moisture by weight. In addition, the use of a pneumatic conveyor provides a means of removing the ultra-fine dust and particulate that has been generated by processing up to this point. This particulate may be added back to the material during production of the fine-grade material, as explained below. Removal of the ultra-fine dust and particulate also reduces the risk of fire or explosion that may result if the particulate-air stream were to be exposed to a spark or flame.

At step 24 of FIG. 1, the particles emerging from the pneumatic conveyor are pre-screened to ensure that they are no larger than a set size. In the preferred embodiment, a screen size of 7 mesh is used, although other sizes could be used in alternative embodiments. Those particles that are too large to fit through the screen are returned to the refiner at refining step 20 for further size reduction. These particles, which cannot pass through the 7 mesh screen, are those that are larger than about 0.111 inches in diameter.

Those particles that pass through the pre-screening process at step 24 are passed to the final screening at step 26. In the preferred embodiment, three different screen sizes are employed in order to produce finished product that falls into three different grades: coarse, medium, and fine. Coarse particles are those that do not pass through a screen of 18 mesh size. This corresponds to particles larger than about 0.0394 inches in diameter. These coarse particles may then be conveyed away for separate storage. The particles that pass through the 18 mesh size screen are then introduced to a screen at 60 mesh size, and those that do not pass through are deemed the "medium" particles. They may also be conveyed away for separate storage. These particles are those that are larger than about 0.0098 inches in diameter. Those that pass through the 60 mesh size screen are passed to a screen of 200 mesh size. Those that do not pass through are deemed the "fine" particles. These particles are those larger than about 0.0029 in diameter. The very fine particular material or dust that passes through the 200 mesh screen may be sent to a bag house. It may be noted that in the case where there is an excess of coarse or medium particles, these may be returned to refining step 20 in order to reduce their size, whereby a larger quantity of the fine particles will be passed upon the process being repeated.

In step 28, the course, medium, and fine particles resulting from this process may be packaged for shipment, in a manner as known in the art. The discrete particle sizes may be collected in bins, then bagged discretely. Alternatively, the sizes may be mixed in specified proportions in order to produce a custom blended product for various unique applications.

The finished product resulting from this process will be a collection of crumbled pellets in graded sizes. In the case of a 100% oak product, the approximate bulk density of the crumbles will be about 22 to 27 pounds per cubic foot for the fine particles, about 29 to 32 pounds per cubic foot for the medium particles, and about 30 to 34 pounds per cubic foot for the course particles. Again referring to the case where the crumbles are 100% oak, the crumbles will be dark to light tan in color, the color being lighter for the smaller particles. The specific gravity will also vary somewhat with particle size, with the finer particles being lower in specific gravity. In the preferred embodiment, the course/medium/fine particles vary within a specific gravity range of about 1.1 to 1.3. This is seen as an ideal range for various drilling fluids, such that custom mixing of the sizes may result in a formulation with a specific gravity that precisely matches that of the drilling fluid used in a particular application. It is desirable that the specific gravity of the crumbled pellets be within 10% of the specific gravity of the drilling fluid. It may be noted that due to the cutting/shearing action by which the particles are manufactured, their appearance will be well defined, and not frayed as nature as are many fiber products known in the prior art. It is believed by the inventor that this aspect of the crumbled pellets is a factor in the action of the crumbles to substantially remain integral when presented into drilling fluid, rather than disassociating into their constituent fibers.

The steps in using the finished product resulting from the manufacturing process of FIG. 1 according to a preferred embodiment of the present invention may now be described. The user may choose one or more of the coarse, medium, or fine particle material depending upon the present application. It is believed that the fine particles are particularly suited for use in drilling fluid as seepage control, whereas the medium and coarse particles are better for loss circulation material applications. In addition, the medium particles may be used for a well finishing "sweep" product. Other applications may be found in various drilling fluid applications. For example, if the cutting head is expected to encounter porous subterranean formations during the drilling process, then the medium or fine material may be added, either alone or in combination with the other, to the drilling fluid as an aid. This material is sized so as to aid in the prevention of seepage of drilling fluid into porous rock formations. Alternatively, such material may be added to the drilling fluid during drilling if porous subterranean formations are unexpectedly encountered. If a void is encountered during drilling, then the drilling operation may be stopped while coarse material is added to the drilling fluid. The coarse material is sized to be most effective in plugging voids encountered during a drilling operation. The coarse material helps to form a plug over the void in order to prevent further loss of drilling fluid, and also to prevent a "blow out" during drilling.

The particles produced according to this method have numerous advantages when employed in drilling fluid. They have been found to at least maintain and in some cases to improve the electrical stability of the drilling "mud." Because the density of the crumble is matched to the drilling fluid, and because the crumble does not disassociate into its constituent components when dispersed in the drilling mud, the particles do not reduce the mud density. The particles have been found to simply displace mud without expansion in oil-based drilling fluids, thereby maintaining a constant overall mud density. They also have been found not to adversely affect the viscosity of the drilling fluid, which is an important parameter in LCM performance. Finally, the geometry of the particles is seen to somewhat mimic the nut-shell type of LCMs, which provides desirable mud properties as well.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A loss circulation material for introduction into a drilling fluid, the material comprising a mixture of crumbled pellet particles of a plurality of grades, the crumbled pellet particles consisting essentially of wood fiber and moisture without an additional binder material, wherein each of said crumbled pellet particles comprises a particle diameter, further wherein said plurality of grades comprises a coarse particle grade, a medium particle grade, and a fine particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, further wherein said particle diameter of said crumbled pellet particles of said fine particle grade is between 0.0029 inches and 0.0098 inches, wherein the crumbled pellet particles have a specific gravity greater than 1.0, and further wherein the crumbled pellet particles remain substantially integral when introduced into the drilling fluid.

2. The loss circulation material of claim 1, wherein said wood fiber consists essentially of hardwood wood fiber.

3. The loss circulation material of claim 2, wherein said wood fiber consists essentially of oak wood fiber.

4. The loss circulation material of claim 1, wherein the specific gravity of the crumbled pellet particles is in the range of 1.1 to 1.3.

5. The loss circulation material of claim 1, wherein the specific gravity of the mixture of crumbled pellet particles is within 10% of the specific gravity of the drilling fluid.

6. The loss circulation material of claim 1, wherein the moisture comprises 4 to 8% of the crumbled pellet particles by weight.

7. A method for augmenting a drilling fluid with a loss circulation material, the material comprising a plurality of crumbled pellets, the crumbled pellets consisting essentially of wood and moisture, said method comprising the steps of:
   (a) acquiring a hardwood material;
   (b) drying the hardwood material;
   (c) grinding the hardwood material to produce a uniform hardwood material;
   (d) pelletizing the uniform hardwood material to produce pellets;
   (e) cooling the pellets;
   (f) crumbling the pellets to produce particles wherein said particles comprise a particle diameter, the particles having a specific gravity greater than 1.0;
   (g) grading the particles by means of a plurality of screens, wherein said plurality of screens comprise a 18 mesh size screen, a 60 mesh size screen, and a 200 mesh size screen, further wherein said graded particles comprise a coarse particle grade, a medium particle grade, and a fine particle grade, wherein said particle diameter of said particles of said coarse particle grade is greater than 0.0394 inches, further wherein said particle diameter of said particles of said medium particle grade is between 0.0098 inches and 0.0394 inches, further wherein said particle diameter of said particles of said fine particle grade is between 0.0029 inches and 0.0098 inches, further wherein said particles of said coarse particle grade are captured by said 18 mesh size screen, further wherein said particles of said medium particle grade pass through said 18 mesh size screen and are captured by said 60 mesh size screen, further wherein said particles of said fine particle grade pass through said 18 mesh size screen and said 60 mesh size screen and are captured by said 200 mesh size screen; and
   (h) mixing the graded particles with the drilling fluid, wherein the particles remain substantially integral within the drilling fluid after the mixing step.

8. The method of claim 7, wherein the mixing step comprises the step of adding the graded particles to the drilling fluid in a mud pit.

9. A method for manufacturing a loss circulation material for introduction into a drilling fluid, wherein the loss circulation material consists essentially of wood and water, said method comprising the steps of:
   (a) drying a wood source material to a desired moisture content;
   (b) pelletizing the source material to produce a plurality of pellets, wherein the specific gravity of the plurality of pellets is greater than 1.0;
   (c) crumbling the pellets into smaller crumbled pellet particles, wherein said crumbled pellet particles comprise a particle diameter;
   (d) screening the crumbled pellet particles through a plurality of mesh screens to produce a plurality of crumbled pellet particle size grades, wherein said plurality of mesh screens comprise a 18 mesh size screen, a 60 mesh size screen, and a 200 mesh size screen, further wherein said crumbled pellet particle size grades comprise a coarse particle grade, a medium particle grade, and a fine particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, further wherein said particle diameter of said crumbled pellet particles of said fine particle grade is between 0.0029 inches and 0.0098 inches, further wherein said crumbled pellet particles of said coarse particle grade are captured by said 18 mesh size screen, further wherein said crumbled pellet particles of said medium particle grade pass through said 18 mesh size screen and are captured by said 60 mesh size screen, further wherein said crumbled pellet particles of said fine particle grade pass through said 18 mesh size screen and said 60 mesh size screen and are captured by said 200 mesh size screen; and
   (e) mixing at least two of the crumbled pellet particle size grades to produce a mixture of crumbled pellet particle grades in the loss circulation material.

10. The method of claim 9, wherein said drying step comprises the step of drying the source material to 10% to 14% moisture content by weight.

11. The method of claim 10, further comprising the step of grinding the source material to a uniform size prior to the pelletizing step.

12. The method of claim 11, wherein the pellets produced in the pelletizing step comprise a bulk density in the range of 22 pounds per cubic foot to 34 pounds per cubic foot.

13. The method of claim 9, wherein the screening step further comprises the step of returning any oversized crumbled pellet particles to the crumbling step.

14. The method of claim 9, wherein the mixture of crumbled pellet particles specific gravity is within 10% of the specific gravity of the particular drilling mud.

* * * * *